Oct. 18, 1932.    O. U. ZERK    1,883,275
LUBRICATING NIPPLE
Filed Sept. 30, 1929
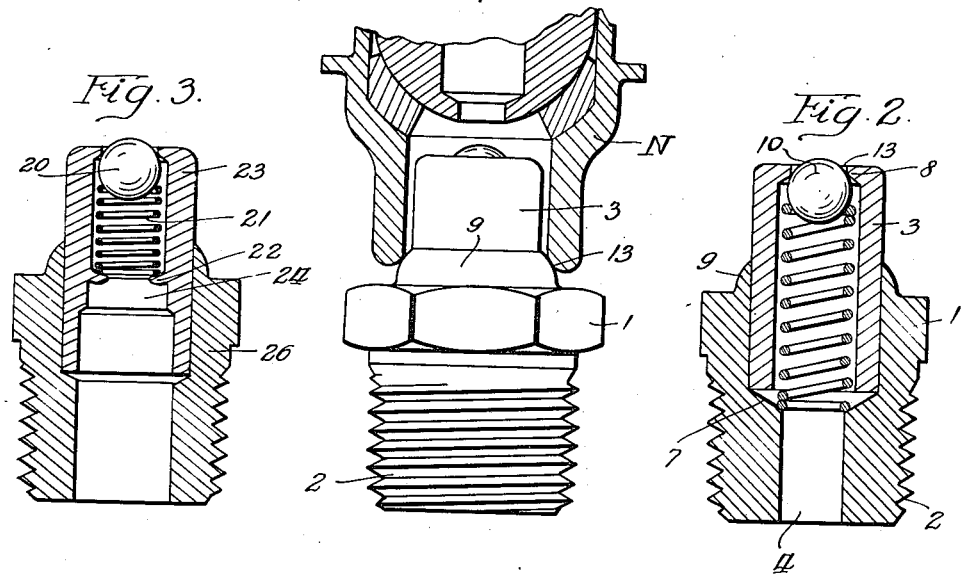
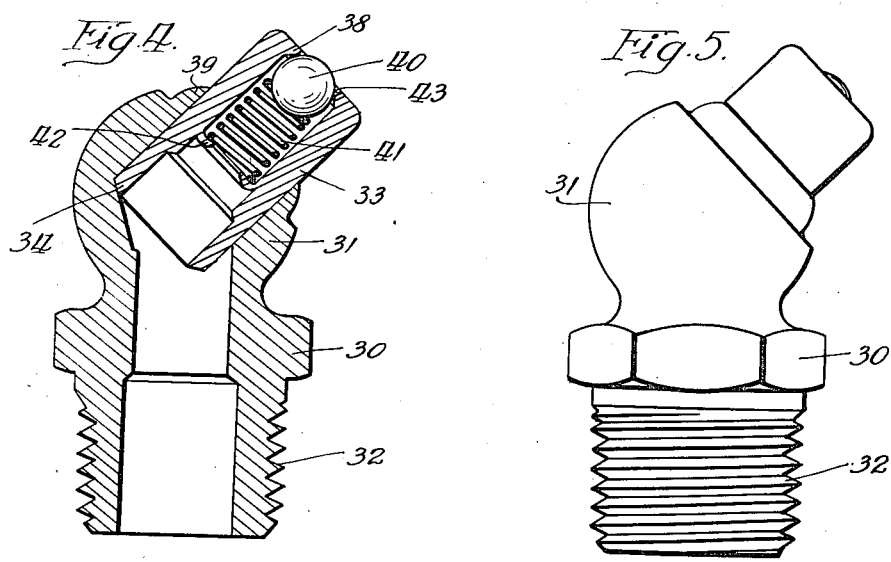
Inventor:
Oscar U. Zerk.

Patented Oct. 18, 1932

1,883,275

UNITED STATES PATENT OFFICE

OSCAR U. ZERK, OF CHICAGO, ILLINOIS, ASSIGNOR TO ALEMITE CORPORATION, OF CHICAGO, ILLINOIS, A CORPORATION OF DELAWARE

LUBRICATING NIPPLE

Application filed September 30, 1929. Serial No. 396,353.

My invention relates to improvements in lubricating nipples, and relates more particularly to improvements in that type of lubricating nipples, adapted to be permanently mounted on elements of machine bearings, and applicable equally well to effect transmission of lubricant from lubricant guns to the bearings for vehicles, or the bearings for stationary machines.

More particularly my invention relates to lubricant receiving nipples which are generally of the type shown and described in my United States Letters Patent, No. 1,748,817, issued February 25, 1930, and in which I broadly claim the combination with a nipple such as those herein disclosed, of a lubricant dispensing nozzle of specialized design adapted to cooperate therewith, in a special manner determined by novel structure of the nozzle, and is companion to my pending application for United States Letters Patent, Serial No. 397,714, filed coincidentally herewith for improvements in lubricating nipples, and in which there are disclosed and claimed lubricating nipples of an alternate construction to that disclosed and claimed herein.

In the present application, therefore, I propose to claim only those features of improvement which are inherent in the nipple herein shown and described, per se; and as an article of manufacture, and by virtue of which improvements, the following objects of my invention are attained.

An object of my present invention is to provide a lubricant receiving nipple of improved construction of the general type employed in lubricating systems of the contact type, wherein a lubricant sealing contact between a gun nozzle and a lubricant receiving nipple, during the lubricating operation, is maintained by manual pressure exerted upon the nozzle towards the nipple to keep them in pressure engagement. Hereinafter I refer to nipples of this general type, as of the contact type, as distinguished from that type of nipples adapted to positively interlock with a nozzle to receive lubricant therefrom, which are known as the interlocking type.

Another object of my invention is to provide a nipple of the contact type of rugged construction which is adapted to be rigidly secured to a machine part adjacent a bearing surface to be lubricated and wherein the lubricant sealing surface of the nipple is shielded to protect it from being struck by extraneous objects, such as stones, mechanics' tools, or the nozzle of a lubricating gun, improperly applied to the nipple.

Another object of my invention is to provide an improved nipple of the contact type which may be economically manufactured in two separate parts adapted to be rigidly secured together to form a unitary nipple.

Another object of my invention is to provide an improved unitary nipple formed of two separately formed interfitted parts, in an economical manner.

Another object of my invention is to provide an improved unitary nipple formed of two separately formed interfitted parts, wherein one of such parts comprising the lubricant receiving inlet part, may be formed in a most economical manner and adapted to be interfitted with any of a number of variably formed supporting parts.

Another object of my invention is to provide an improved nipple of the contact type which will strongly resist breakage or accidental displacement when accidentally struck while mounted in an exposed position adjacent a bearing.

Another object of my invention is to provide an improved nipple of the contact type providing a guide for a nozzle applied thereto and adapted to be telescoped within a mouth of such nozzle to effect a preliminary flow of lubricant over a properly disposed nipple contact surface when so projected within the nozzle mouth.

Another object of my invention is to provide an improved nipple of the contact type which while adapted to perform its intended lubricant receiving function in a highly efficient manner, yet may be manufactured at relatively low cost in quantities.

Another object of my invention is to provide an improved nipple of the contact type having a nozzle contacting surface portion so formed, and disposed relative to the other parts of the nipple as to perform its sealing function in an improved manner.

Another object of my invention is to provide an improved nipple of the contact type so constructed as not to be readily susceptible to slight inaccuracies of manufacture which, in other prior construction, rendered prior nipples of the contact type useless or inefficient.

Another object of my invention is to provide an improved nipple of the contact type especially adaptable for use as an element of an elbow nipple fitting.

Another object of my invention is to provide an improved method of manufacturing nipples of the contact type.

Another object of my invention is to provide an improved nipple as an article of manufacture.

Other objects of my invention and the invention itself will be better understood by reference to the following description of certain embodiments of my invention and which are illustrated in the accompanying drawing and referred to in the said description.

In the drawing:

Figure 1 is an elevational view of a nipple which is an embodiment of my invention, together with a fragment of a cooperative nozzle, shown in longitudinal medial section, applied thereto;

Figure 2 is a view in longitudinal medial section, of the nozzle of Figure 1;

Figure 3 is a view in longitudinal medial section, of a nipple which is another embodiment of my invention; and Figures 4 and 5 are, respectively, longitudinal medial sectional, and elevational views of a third embodiment of my invention.

Referring now first, more particularly, to the embodiment of my invention illustrated in Figures 1 and 2, the nipple thereof comprises a tubular lubricant receiving fitting 3 and a tubular support therefor having a longitudinal bore 4, into an enlarged end of which the fitting 3 is tightly pressed until its interiorly disposed end engages with the shoulder 7 forming the junction of the enlarged and reduced intercommunicating portions of the bore.

The enlarged portion of the bore is of sufficient length relative to the length of the fitting 3, so that a portion of the fitting projects outwardly from the bore of the support, the length of the outwardly projecting portion is preferably not greater than, and in the embodiment illustrated is substantially less than, its diameter. The free end of the fitting is provided with an inturned flange 8 restricting the area of the lubricant receiving opening 13. In the embodiment illustrated this opening is normally closed by a ball valve 10 pressed to its seat by a helical spring 11 interposed between the ball and the shoulder 7 of the support bore.

The support, per se, into which the lubricant inlet fitting is pressed, comprises a waist 1, preferably encircling the inserted end of the fitting, a nozzle contacting portion 9, of annular form, formed integrally with the support, and projecting forwardly from it in tight fitting contact with the exterior wall of the tubular fitting, and a stem 2 integrally formed with the waist but projecting therefrom in a direction oppositely to the nozzle contacting portion 9.

The waist 1 is preferably formed with a hexagonal outer surface, adapted for engagement by a wrench, whereby the externally threaded stem 2 may be turned into an interiorly threaded recess of an element of bearing to which the nipple is to be affixed for lubricating purposes.

The nozzle contacting portion 9 is in the form of an integral tubular flange of the waist portion of the support and its outer surface is inclined inwardly until it meets the outer surface of the tubular fitting 3; the said inclined surface of the nozzle contacting flange 9 is preferably of substantially annular form and preferably longitudinally curved, the radius of curvature being preferably less than the radius of the tubular inlet fitting 3. In the embodiment illustrated the centers of curvature of the longitudinally curved surface are disposed in a circle extending transversely to the tubular fitting 3, the diameter of such circle being substantially equal to twice the radius of longitudinal curvature of the said annular surface.

Such an annular contact surface, formed as above described, is especially efficacious in combination with a tubular nozzle, such as that shown at N, having a lubricant sealing nipple engaging contact surface 13 at its annular end, and which is adapted to be oscillated while in lubricant sealing contact with the annular surface of the flange 9, over said surface, as more fully described in my said United States Patent No. 1,748,817, issued February 25, 1930.

Referring now to the embodiment of my invention illustrated in Figure 3, this embodiment differs from that above described, in that the spring 21, employed for pressing the valve ball 20 to its seat, has its end remote from the ball supported by an inturned flange 22 formed integral with the nipple fitting 23 and projecting from the walls of the fitting bore.

This flange is formed by broaching metal from the intermediately disposed walls 24 of the nipple fitting bore by means of a tool having an end of slightly larger diameter than the initial diameter of the bore portion 24 and forcing it through such bore portion to slightly enlarge it and to upset the displaced wall metal to form the flange.

In this construction the fitting with the inserted ball and spring are of unitary construction, for insertion as a unit into a supporting element such as that shown at 26.

In the embodiment of my invention illustrated in Figures 4 and 5, the fitting support comprises a head 31 of approximately ball or knob form, an intermediate waist 30, and a stem 32, integrally secured together, the head, waist and stem being longitudinally bored, the bore of the head having an end portion extending angularly to the longitudinal bore of the waist and stem.

A tubular fitting 33, like that shown at 23, in the embodiment of Figure 3, is tightly pressed into the said angularly extending portion of the head bore until its interiorly disposed end 34 engages with a lateral wall of the longitudinal bore, leaving an outwardly projecting portion of the fitting extending from the head bore. As in the preceding embodiment, the outwardly extending portion of the fitting is preferably of a length not greater than its diameter, and is provided at its end in a lubricant receiving opening 43 normally closed by a valve ball 40 spring pressed to seating engagement with the inturned flange 38 at the end of the fitting by an interiorly disposed spring 41 seated against an interior annular flange 42 formed in the same manner and functioning the same as that shown at 22 in the embodiment of Figure 3.

The head of the support comprises a tubular flange 39 extending therefrom for a short distance along the tubular fitting 33 against the exterior surfaces of which it closely fits. The flange 39 provides an inclined annular surface preferably longitudinally curved in the manner more particularly described in connection with the similar flange 9 described in connection with the embodiment of my invention illustrated in Figures 1 and 2.

Having thus described my invention in several embodiments, I am aware that numerous and extensive departures may be made from the embodiments herein illustrated and described but without departing from the spirit of my invention.

I claim:

1. A lubricating nipple of the contact type comprising a pair of interfitted tubular supporting and lubricant receiving elements, extending angularly from their interfitted portions, the supporting portion having an annular flange presented toward the projecting end of the receiving element, said flange provided with a nozzle engaging lubricant sealing contact surface disposed in a manner to be protected by portions of said receiving and supporting elements for a nozzle engaging therewith for dispensing lubricant into the receiving element.

2. A lubricating nipple of the contact type comprising a pair of interfitted tubular supporting and lubricant receiving elements, extending diversely from their interfitted portions, the supporting portion having an annular flange presented toward the projecting end of the receiving element, said flange provided with a nozzle engaging lubricant sealing contact surface for a nozzle engaging therewith for dispensing lubricant into the receiving element, said surface being of annular form and curved convexly longitudinally of the receiving element and disposed to be protected by portions of said receiving and supporting elements.

3. A contact type lubricating nipple comprising separate interfitted tubular lubricant receiving nipple and nipple supporting elements each projecting in angularly diverse directions from their interfitted portions, said supporting element having a tubular flange, embracing the receiving nipple remotely of its free end, presenting a nozzle engaging lubricant sealing contact surface disposed in a manner to be protected by said receiving and supporting elements toward the free end of the nipple.

4. A contact type lubricating nipple comprising separate interfitted tubular lubricant receiving nipple and nipple supporting elements each projecting in angularly diverse directions from their interfitted portions, said supporting element having a tubular flange surrounding the nipple and having an inclined contact surface of annular form disposed to be protected by portions of said receiving and supporting elements and engageable with an annular end of a tubular nozzle telescoped over the nipple for dispensing lubricant thereto, and adapted to make substantially leakproof contact therewith.

In witness whereof, I hereunto subscribe my name this 28 day of September, 1929.

OSCAR U. ZERK.